United States Patent
Beigman Klebanov et al.

(10) Patent No.: US 11,749,131 B1
(45) Date of Patent: Sep. 5, 2023

(54) E-BOOK READING COMPREHENSION ANALYTICS

(71) Applicant: Educational Testing Service, Princeton, NJ (US)

(72) Inventors: Beata Beigman Klebanov, Hopewell, NJ (US); Anastassia Loukina, Bellport, NY (US); Nitin Madnani, Princeton, NJ (US); John Sabatini, Cherry Hill, NJ (US); Jennifer Lentini, Philadelphia, PA (US)

(73) Assignee: Educational Testing Service, Princeton, NJ (US)

( * ) Notice: Subject to any disclaimer, the term of this patent is extended or adjusted under 35 U.S.C. 154(b) by 666 days.

(21) Appl. No.: 16/587,706

(22) Filed: Sep. 30, 2019

Related U.S. Application Data (60) Provisional application No. 62/739,583, filed on Oct. 1, 2018.

(51) Int. Cl.
   *G09B 17/00* (2006.01)
   *G06F 15/02* (2006.01)
   (Continued)

(52) U.S. Cl.
   CPC ......... *G09B 17/003* (2013.01); *G06F 3/0483* (2013.01); *G06F 15/0291* (2013.01); *G06N 3/08* (2013.01)

(58) Field of Classification Search
   None
   See application file for complete search history.

(56) References Cited

U.S. PATENT DOCUMENTS

| | | | | |
|---|---|---|---|---|
| 8,777,626 | B2 * | 7/2014 | Levy | G09B 17/003 434/167 |
| 2002/0156632 | A1 * | 10/2002 | Haynes | G09B 17/003 704/270 |

(Continued)

OTHER PUBLICATIONS

Crossley, Scott, McNamara, Danielle; Educational Technologies and Literacy Development; Ch. 1 in Adaptive Educational Technologies for Literacy Instruction; Routledge: New York, NY; pp. 1-12; 2017.

(Continued)

*Primary Examiner* — Christopher J Fibbi
(74) *Attorney, Agent, or Firm* — Jones Day (57) ABSTRACT

Reading comprehension of a user can be assessed by presenting, in a graphical user interface, sequential reading text comprising a plurality of passages. The graphical user interface can alternate between (i) automatically advancing through passages of the reading text and (ii) manually advancing through passages of the reading text within the graphical user interface which is in response to user-generated input received via the graphical user interface. An audio narration is provided during the automatic advancing of the reading text. An audio file is recorded during the manual advancing of the reading text which is used to automatically determine an estimated level of reading comprehension of the user. Data characterizing the determined level of reading comprehension of the user can then be provided (e.g., displayed, loaded into memory, stored on a hard drive, transmitted to a remote computing system, etc.). Related apparatus, systems, techniques and articles are also described.

18 Claims, 8 Drawing Sheets

(51) Int. Cl.
*G06N 3/08* (2023.01)
*G06F 3/0483* (2013.01)

(56) References Cited

U.S. PATENT DOCUMENTS

| | | | | |
|---|---|---|---|---|
| 2006/0008781 | A1* | 1/2006 | Townshend | G09B 17/006 434/178 |
| 2008/0140652 | A1* | 6/2008 | Millman | G06F 16/34 |
| 2014/0013192 | A1* | 1/2014 | McQuiggan | G09B 5/062 715/203 |
| 2016/0378720 | A1* | 12/2016 | Bacus | G06F 40/103 715/251 |
| 2017/0154539 | A1* | 6/2017 | King | G09B 5/12 |
| 2017/0337841 | A1* | 11/2017 | Styles | G09B 17/006 |

OTHER PUBLICATIONS

Eccles, Jacquelynne, Wigfield, Allan; Motivational Beliefs, Values, and Goals; Annual Review of Psychology, 53; pp. 109-132; 2002.

Hasbrouck, Jan, Tindal, Gerald; An Update to Compiled ORF Norms; Technical Report No. 1702; Behavioral Research and Teaching, University of Oregon; 2017.

Li, Jinyu, Deng, Li, Gong, Yifan, Haeb-Umbach, Reinhold; An Overview of Noise-Robust Automatic Speech Recognition; IEEE/ACM Transactions on Audio, Speech, and Language Processing, 22(4); pp. 745-777; Apr. 2014.

Loukina, Anastassia, Liceralde, Van, Beigman Klebanov, Beata; Towards Understanding Text Factors in Oral Reading; Proceedings of National American Association of Computational Linguistics-Human Language Technologies; pp. 2143-2154; Jun. 2018.

Meisinger, Elizabeth, Bradley, Barbara, Schwanenflugel, Paula, Kuhn, Melanie; Teachers' Perceptions of Word Callers and Related Literacy Concepts; School Psychology Review, 39(1); pp. 54-68; Mar. 2010.

Mostow, Jack; Why and How Our Automated Reading Tutor Listens; Proceedings of the International Symposium on Automated Detection of Errors in Pronunciation Training; pp. 43-52; 2012.

NAEP Reading Report Card, 2017; http://www.nationsreportcard.gov/reading_2017/nation/scores?grade=4.

Petscher, Yaacov, Kim, Young-Suk; The Utility and Accuracy of Oral Reading Fluency Score Types in Predicting Reading Comprehension; Journal of School Psychology, 49(1); pp. 107-129; Feb. 2011.

Sabatini, John, Wang, Zuowei, O'Reilly, Tenaha; Relating Reading Comprehension to Oral Reading Performance in the NAEP Fourth-Grade Special Study of Oral Reading; Reading Research Quarterly, 54(2); pp. 253-271; Apr./May/Jun. 2019.

Swerdzewski, Peter, Harmes, J. Christine, Finney, Sara; Two Approaches for Identifying Low-Motivated Students in a Low-Stakes Assessment Context; Applied Measurement in Education, 24(2); pp. 162-188; Apr. 2011.

Wayman, Miya Miura, Wallace, Teri, Wiley, Hilda Ives, Ticha, Renata, Espin, Christine; Literature Synthesis on Curriculum-Based Measurement in Reading; Journal of Special Education, 41(2); pp. 85-120; 2007.

Wise, Steven, DeMars, Christine; Examinee Non-Effort and the Validity of Program Assessment Results; Educational Assessment, 15(1); pp. 27-41; 2010.

Wise, Steven, Kong, Xiaojing; Response Time Effort: A New Measure of Examinee Motivation in Computer-Based Tests; Applied Measurement in Education, 18; pp. 163-183; 2005.

* cited by examiner

E-BOOK READING COMPREHENSION ANALYTICS

CROSS REFERENCE TO RELATED APPLICATION

The current application claims priority to U.S. Pat. App. Ser. No. 62/739,583 entitled "Analytics of Children's eBook Reading" and filed on Oct. 1, 2018, the contents of which are hereby fully incorporated by reference.

TECHNICAL FIELD

The subject matter described herein relates to characterizing reading comprehension of users utilizing electronic books.

BACKGROUND

Electronic books (e-books) are increasingly being adopted for users of all ages. Not only do e-books provide a convenient, uniform manner in which text can be read, they also provide an efficient mechanism to identify and store content.

SUMMARY

In one aspect, reading comprehension of a user can be assessed by presenting, in a graphical user interface, sequential reading text comprising a plurality of passages. The graphical user interface can alternate between (i) automatically advancing through passages of the reading text and (ii) manually advancing through passages of the reading text within the graphical user interface which is in response to user-generated input received via the graphical user interface. An audio narration is provided during the automatic advancing of the reading text. An audio file is recorded during the manual advancing of the reading text which is used to automatically determine an estimated level of reading comprehension of the user. Data characterizing the determined level of reading comprehension of the user can then be provided (e.g., displayed, loaded into memory, stored on a hard drive, transmitted to a remote computing system, etc.).

The graphical user interface can be configured to periodically display comprehension questions. The user can then provide answers via the graphical user interface to the comprehension questions. With such variations, the determined level of reading comprehension is based on both the recording and the received answers to the comprehension requests. In addition, an average amount of time spent by the user reading a page is used to estimate the level of reading comprehension A number of user-initiated page turns can be logged during the manual advancing. The logging can be used to determine an average amount of time per user-initiated page turn which, in turn, can be used to provide the estimate.

The recording can be parsed into text using at least one automatic speech recognition algorithm. This parsed text can be automatically compared with the corresponding passages and such comparison can be used to determine the estimated level of reading comprehension.

The providing data can include one or more of causing the determined level of reading comprehension of the user to be displayed in an electronic visual display, transmitting the determined level of reading comprehension of the user to a remote computing system, loading the determined level of reading comprehension of the user into memory, or storing the determined level of reading comprehension of the user on a physical hard drive.

The graphical user interface can form part of a dedicated reading application to be executed on a tablet computer, a mobile phone, desktop, or other computing device.

Machine learning and/or statistical models which are trained or otherwise derived from measurements from a plurality of historical users can be used to estimate the level of comprehension. In some variations, the machine learning model can be a neural network model and/or a logistic regression model.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced and unobtrusive techniques for characterizing a level of reading comprehension of a user.

The details of one or more variations of the subject matter described herein are set forth in the accompanying drawings and the description below. Other features and advantages of the subject matter described herein will be apparent from the description and drawings, and from the claims.

DETAILED DESCRIPTION

Learning analytics, as provided herein, provides insight into learning processes and outcomes by means of collection and analysis of relevant large scale data, which is greatly facilitated by today's digital environments. Indeed, a majority of K-12 teachers in the U.S. make daily use of technology in their classroom. This widespread adoption provides an opportunity to track the processes of learning that are happening over the technological platform (a) unobtrusively, and (b) in rich and minute detail, and seek insight into cognitive, behavioral, social and other aspects of the necessarily complex process of human learning and development.

The current subject matter is directed to technologies for assessing and monitoring reading development. The examples provided below relate to studies of a group of upper elementary school children engaging in a daily independent book reading activity over the course of a summer camp. Analyzing the collected data, it was first sought to confirm findings in the reading literature about inter-connection among various reading subskills, by specifically considering the relationship between reading comprehension and reading rate. It was found that the relationship is not straightforward, and is mediated by a behavioral (that is, not skill based) aspect of the child's long-term engagement with the reading app.

The current subject matter is advantageous in that it provides technical advances to help low proficiency readers improve their reading skill through sustained reading with technology-based support, specifically targeting the transition from word-by-word reading to reading fluency. The method provided herein provided enhanced techniques to engage the user in the flow and process of reading for meaning and pleasure by (a) choosing a high-interest, fairly long and fairly challenging book, and (b) using technology to enhance engagement, alleviate frustration, and provide feedback. The current subject matter allows the user to take turns reading aloud with a virtual partner, along with an audiobook narration. Such an arrangement is based on the premise the interest in the story and the quality of the narration would increase enjoyment, while the interleaving of the effortful reading with the more relaxing experience of listening to a skilled narrator should help reduce the perceived difficulty of the task. Furthermore, due to the continuity of characters, settings, and events throughout the story, many of the actual words the reader would have to read during his or her turn would have been just read by the narrator in his turn, effectively modeling the target reading behavior for the user while also advancing in the story.

FIGS. 1-4 are diagrams 100-400 which illustrates a reading application (reading app) which can be executed on a mobile device such as a tablet or mobile phone or alternatively on a desktop computer. The reading app can be made available both via the web and also as standalone iOS and Android apps. The mobile versions of the reading app can be built using APACHE CORDOVA—a cross-platform toolkit—with platform-specific modifications where necessary. The reading and listening components in the web and mobile versions of the reading app can be built on top of Readium, a robust, standards-compliant, and open-source EPUB-based reading system.

As will be described below, the reading app can operate in different manners such that passages of the text are narrated while other passages are not narrated (thus allowing the user to read out loud or read silently). Further, the reading app can pose certain comprehension questions interstitially within the text (i.e., between passages, etc.). The users behavior with the reading app as well as the answers to the comprehension questions can all be used to estimate a level of reading comprehension of the user. Further, the user and/or an administrator can selectively change the amounts of narrated text (and conversely non-narrated text) (i.e., length of page turns) which can affect the number and placement of the comprehension questions. The estimated level of reading comprehension can be based on metrics associated with a large population of readers (e.g., students in the same grade, students at the same reading comprehension level, etc.). Various models including machine learning or other statistical models (trained using historical data generated by a population of users when reading the same or similar text) can help improve the estimate by factoring in question difficulty estimates (from prior users reading same text) or by comparing to commonly observed behavior in terms of response time and correctness of responses to comprehension questions (from prior users reading same or similar texts) (which, in some variations, can be a score).

In order to check that the readers are paying attention to the story they are reading and not only "calling words", as well as to remind the reader about the important points in the story, more than 700 reading comprehension questions were created, approximately one question for every 100 words of running text. These are surface-level questions focused on the plot, on relationships between characters, on descriptive detail of characters or events that are important for the story overall; the answers to the questions are generally stated in the text. For the data collection examples described herein, the schedule of reading comprehension questions was as follows: the user was asked two questions after every other user turn, namely, the recurrent unit of reading activity was narrator-user-narrator-user-question-question. Each question was anchored to the string in the text that contained the latest piece of information required to answer the question. The reader is asked the two questions that most closely precede the reader's current bookmark (i.e., the point at which the reader paused).

As the children are reading with reading app, the reading app can log information about their interaction with the app. Such interaction can include whether certain words were looked up in an electronic dictionary (by such words being selected in the graphical user interface), a rate of page turn, a rate of inactivity/pausing. Further, the reading app can additionally record and store the audio of the user's turn. In some variations, the reading app can also log rich process data which allow reconstructing the timeline of student interaction with the app, such as timestamps for the beginning and end of each student and narrator turn and answers to comprehension questions.

The data was collected in two summer camp programs during June-August of 2018. One program ran for 6 weeks and included a reading session with the app for 20-50 minutes four days a week, with fewer days in the first week of the camp. The second program ran for the total of 8 weeks (different children were enrolled for a different number of weeks) with a variable reading schedule depending on other camp activities; each reading session included about half an hour of reading and half an hour of related games and activities. While other reading-based activities, unrelated to reading with the app, occurred during camp, neither of the camps specialized in reading instruction. In both camps, the children used the app to read J. K. Rowling's *Harry Potter* and the Sorcerer's Stone and listened to the audiobook narration by Jim Dale. The book contains about 80K words and the narration lasts 8.5 hours. Children read on mobile devices via the reading app in a fairly laid back, informal atmosphere.

The total of 36 children had at least one reading turn logged by the reading app, for a total of 2,390 logged turns. For the purposes of the analyses, children were excluded with <20 reading turns. This excludes 4 children and 51 turns. Of the remaining 32 children, 14 were boys and 18 girls, aged 8-11; mean age was 9 years 8 months as of end of camp. Table 1 describes the data used with this study.

For this analysis, a target performance variable provided herein is percent correct in reading comprehension questions that measures how well children pay attention to important details of the plot of the story.

TABLE 1

Data description. The table shows the distributions of aggregated values for each child. N = 32.

| type of data | mean | std | min | max |
| --- | --- | --- | --- | --- |
| # reading turns | 73 | 42 | 23 | 174 |
| # questions answered | 63 | 38 | 20 | 153 |
| % answered correctly | 66 | 17 | 33 | 100 |
| total audio time recorded (min) | 87 | 68 | 7 | 302 |

The goal of the current subject matter was to explore relationships between the target performance variable and other aspects of reading behavior measured by the reading app. In particular, a strong relationship between reading comprehension and reading rate was identified, which, in turn, is a part of the construct of oral reading fluency.

Reading rate is usually measured as words per minute, or WPM. To calculate a student's reading rate for the given turn, the number of words in the text passage are divided by the recorded duration (in minutes). A medium-to-strong negative correlation of $r=-0.63$ was observed between average reading rate and percent correct in the reading comprehension questions, which seems to suggest, on the face of it, that children who read faster comprehend less well.

Figure 1:
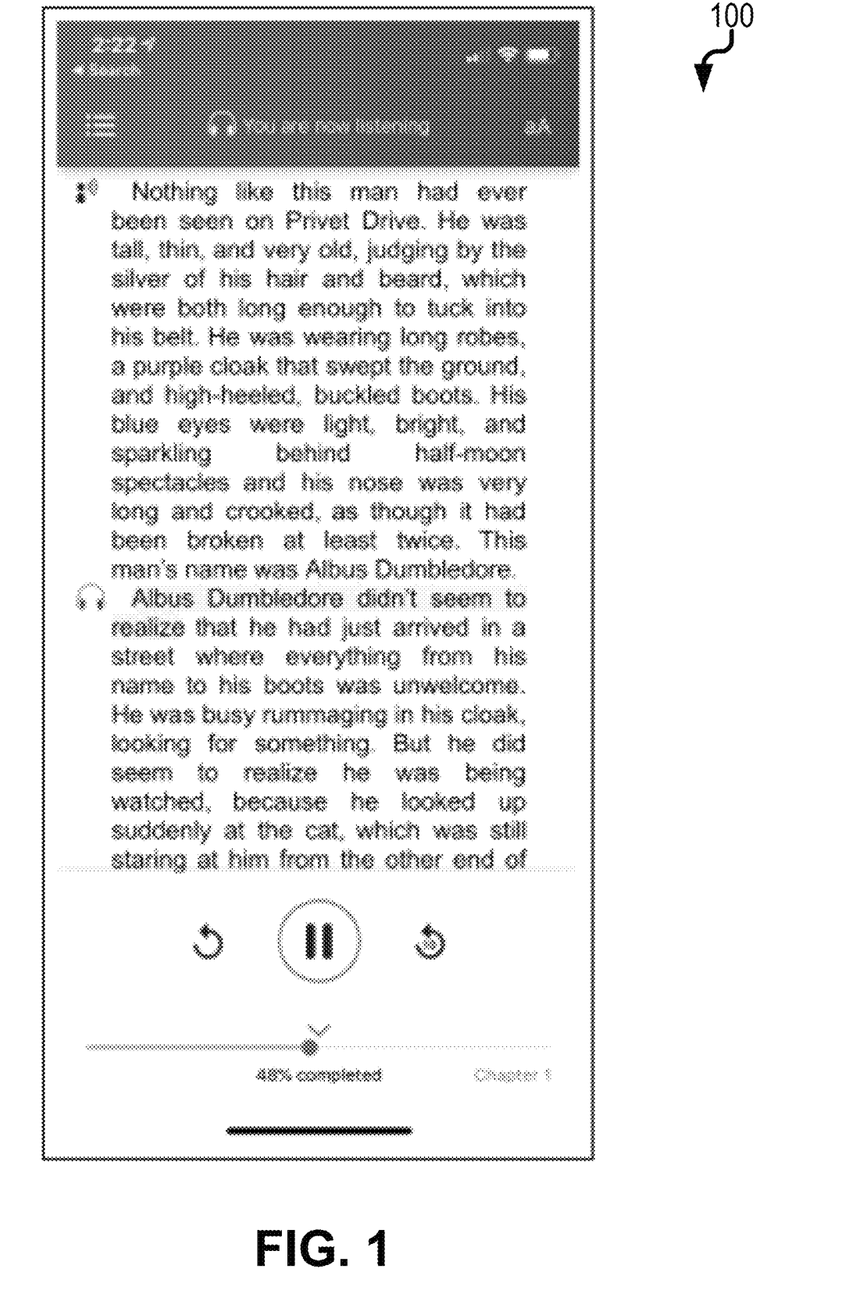
FIG. 1 is a first screenshot of a reading application illustrating automatic advancement of reading text with narration.
Figure 2:
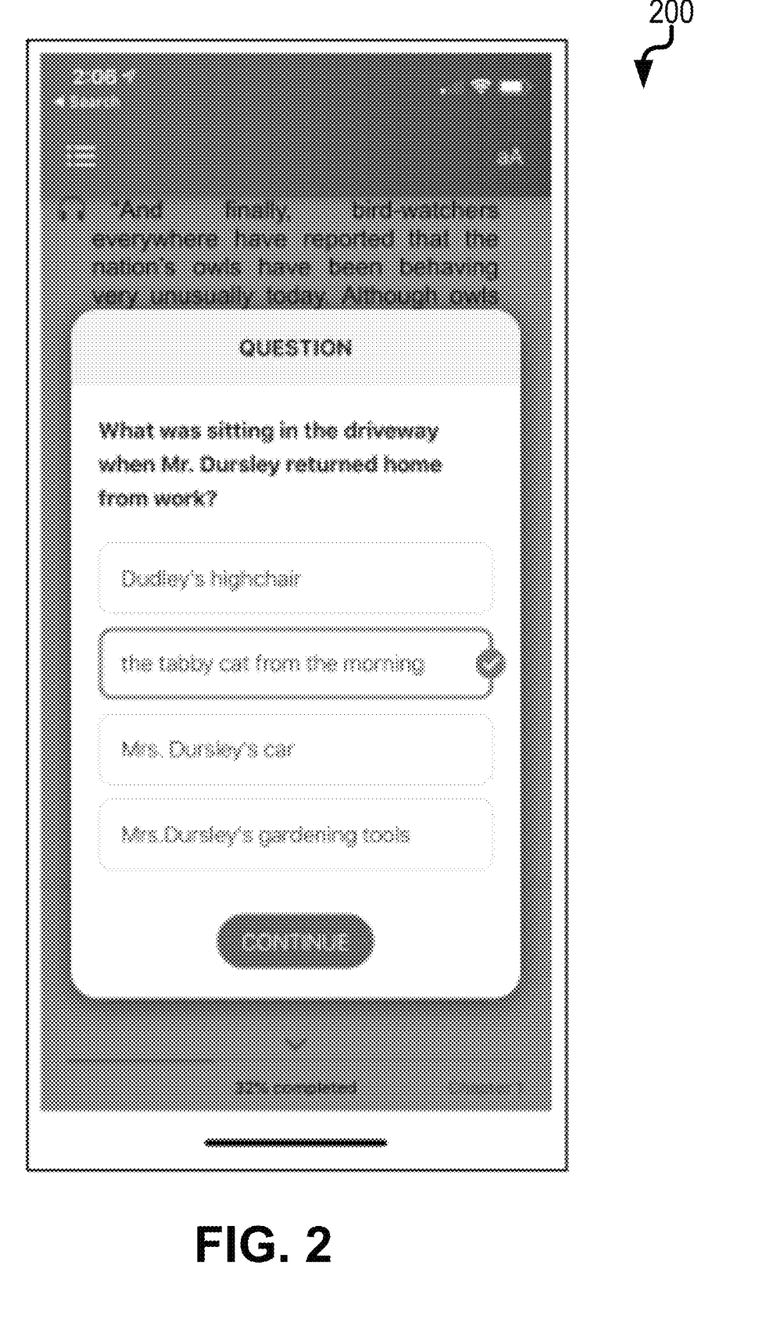
FIG. 2 is a second screenshot of the reading application illustrating presentation of an interstitial reading comprehension.
Figure 3:
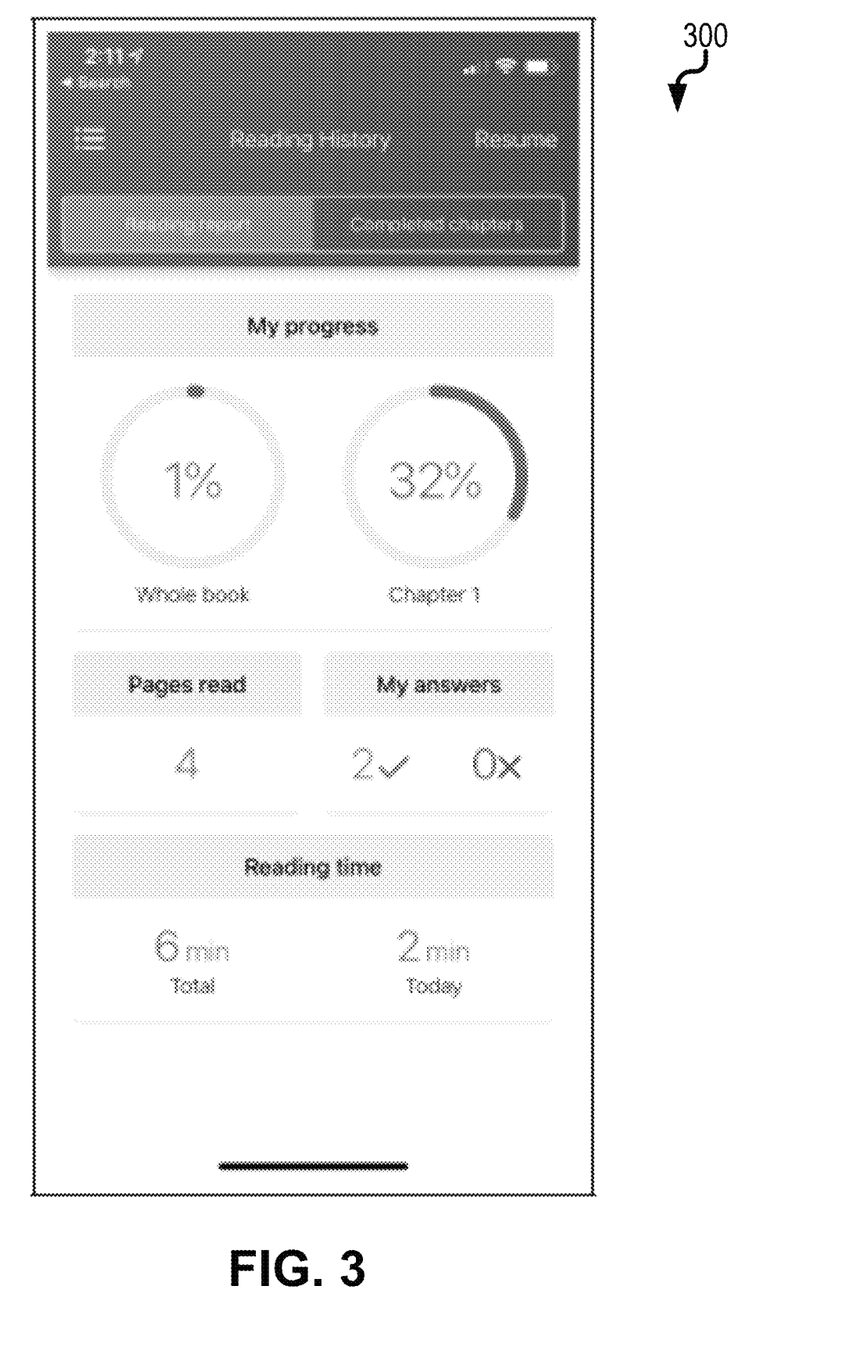
FIG. 3 is a third screenshot of the reading application which illustrates various performance metrics relating to the reading of the text.
Figure 4:
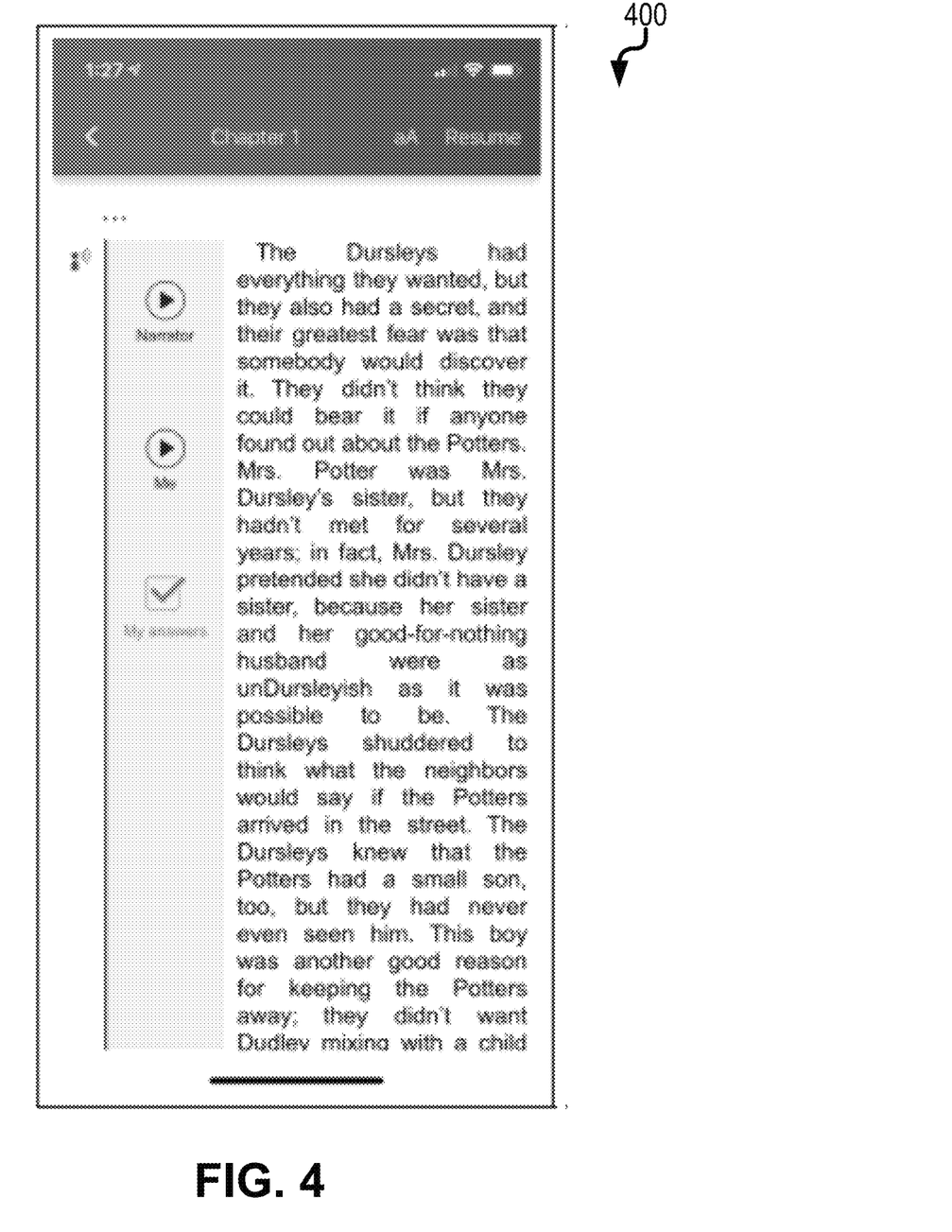
FIG. 4 is a fourth screenshot of the reading application which illustrates an ability for a user to selectively listen to a narration or to silent ready the text.
Figure 5:
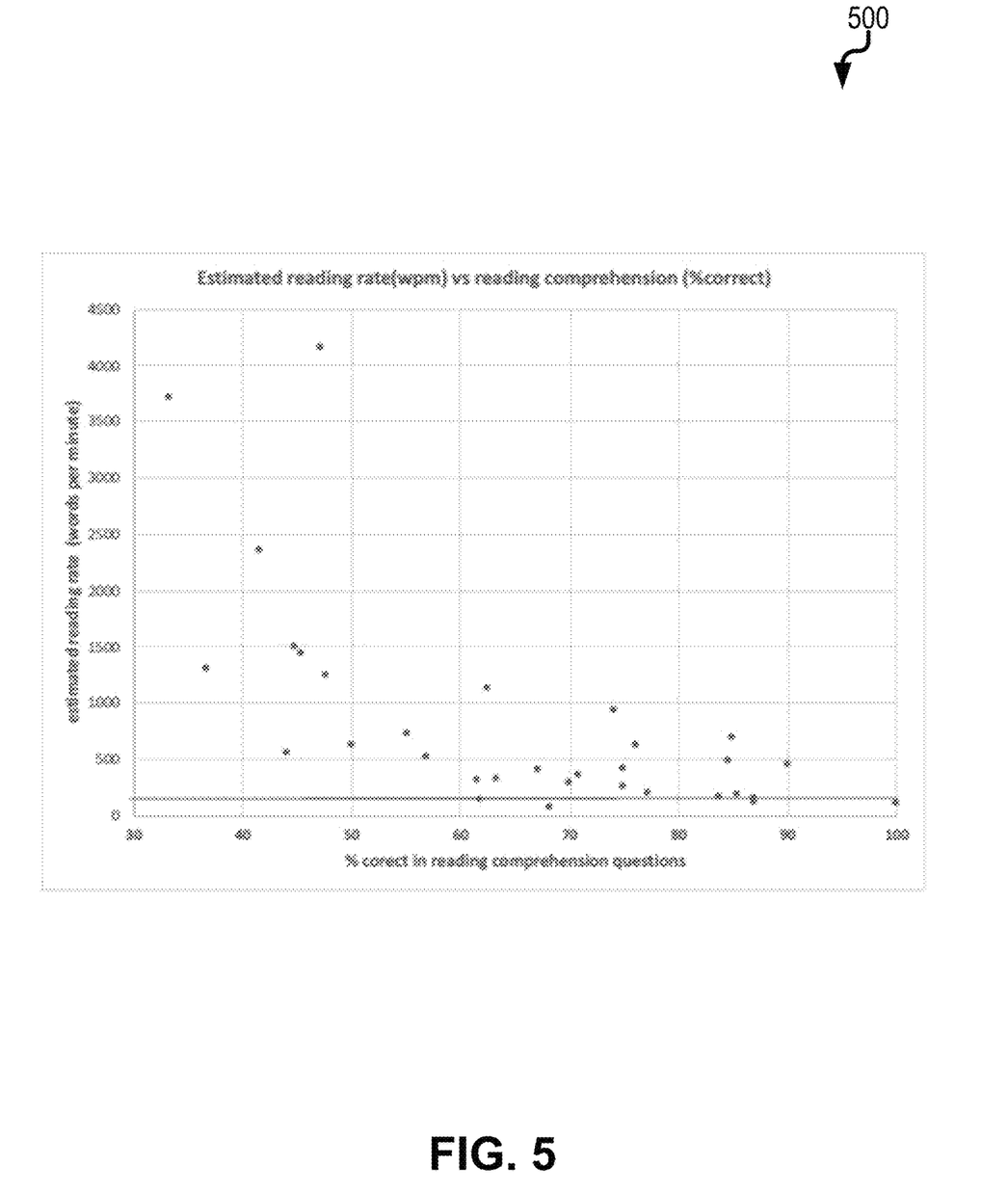
FIG. 5 is a diagram illustrating average reading rate (calculated as length of passage over turn duration) vs. percent correct in reading comprehension questions for each student in a sample.

To further explore this first result, the relationship between reading rate and percent correct in comprehension questions was examined (see diagram 500 of FIG. 5). FIG. 5 illustrates average reading rate (calculated as length of passage over turn duration) vs. percent correct in reading comprehension questions for each student in the sample. The horizontal line indicates average reading rate of the narrator of the book; clearly, values much above the red line are not plausible. The most striking feature of the plot is the scale of the estimated reading rate, reaching thousands of words per minute on average across turns for some readers. Such reading rates are highly implausible; the narrator of the audiobook, an accomplished reader and performer, reads at a rate of about 164 words per minute, on average, for this book. Given that the estimate is length of passage to be read in words over actual time spent in minutes, it stands to reason to assume that quite often the child did not actually read the whole passage before clicking "Done".

Next, boundaries are estimated for turn durations that at least could be a complete, bona-fide reading. This estimations can be based on known oral reading fluency norms for a particular population such as elementary school children. Thus, a 5th grader in the 90th percentile in the winter term would read 183 words per minute; a 3rd grader in the 10th percentile in the winter term is expected to read 62 words per minute.

The second piece of information needed for estimating a reasonable duration per passage is an estimate of within-person variation in reading rates across a large variety of passages. A recent study that tracked two proficient adult readers across hundreds of passages with varying textual characteristics reported a normal-like distribution of reading rate across passages with a standard deviation of just under 10% of the average reading rate for that person.

Thus, relatively permissive boundaries can be set for reading rate per passage as being between a case of a slow reader who reads a passage that yields a reading rate that is two standard deviations below this reader's average (62-2*6=50) and a case of a fast reader who reads a passage that yields a reading rate that is two standard deviations above the average reading rate for that reader (183+2*18=219). Thus, it was not expected that bona-fide reading to be done at a rate faster than 219 words per minute or slower than 50 words per minute. Using the actual number of words for every given passage, a duration range is had that could correspond to a bona-fide reading of the passage.

The data was then re-analyzed, taking only turns with reasonable durations (N=1,335 turns, or 57% of all turns), as the rest of the turns are unlikely to be complete readings. The strong negative correlation disappears; in fact, it was determined that there was no correlation ($r=-0.04$). So, while the counter-intuitive result is explained by presence of turns that were not actually fully read, the expected positive correlation between reading rate and comprehension is not seen.

One possible reason is that the subset of turns with reasonable durations might not represent faithfully a child's reading behavior. Thus, for one reader, out of the total of 128 reading turns, 126 are removed because their durations are shorter than the lower boundary of a reasonable duration. This reader's rate is thus estimated using only 2 turns, which could easily yield an unreliable estimate.

Secondly, the current method of estimating reasonable durations is relatively permissive, so the subset of turns with reasonable durations might still include turns in which the child did not complete the expected reading but for one reason or another achieved the expected turn duration. Substantial presence of such turns in a child's data could undermine estimation of reading rate.

If the sample was restricted further to only children for whom reasonable turns constitute at least 70% of all their turns, that is, children for whom turns with reasonable duration dominate their reading behavior (N=11 children), the expected positive correlation between reading rate and comprehension ($r=0.53$) was observed.

As will be appreciated, the subsetting to reasonable turns and further subsetting to children who tend to have reasonable turns resulted in a dramatic reduction in the size of the dataset. Indeed, as many as 43% of the turns are outside of the reasonable bounds, where 36% are too fast and 7% are too slow. The distribution of proportion of reasonable turns (PRT) per reader has a mean of 0.59 and standard deviation of 0.25. It was determined that this suggests that proportion of likely bona-fide turns shows large variation across readers.

Figure 6:
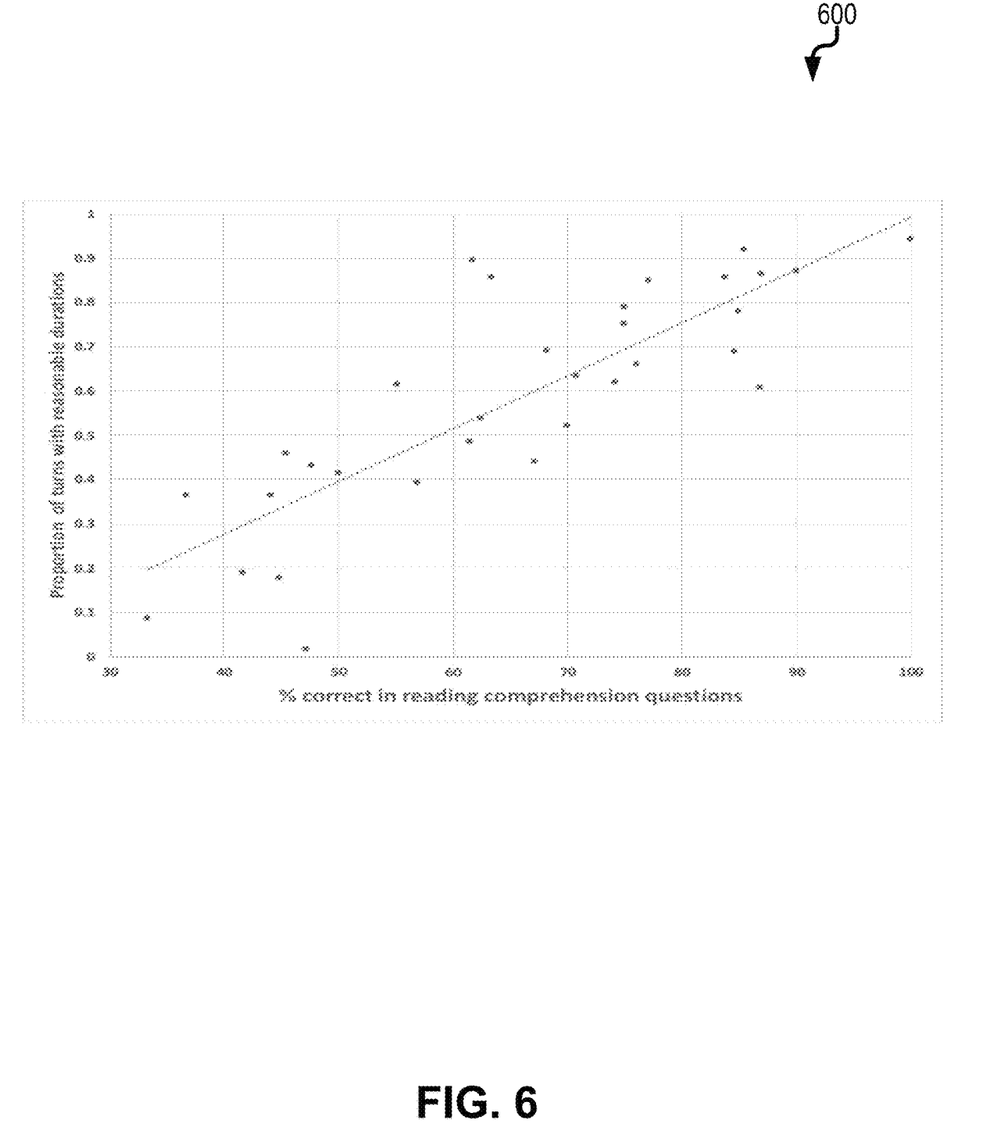
FIG. 6 is a diagram illustrating PRT (y-axis) vs % correct in comprehension questions (x-axis); N=32.

The observed variation in PRT for each child was checked to see if it corresponded to the target performance variable, percent correct in comprehension questions. The two variables were found to be very highly correlated: $r=0.83$. Diagram 600 of FIG. 6 shows a plot relating the two variables.

A novel measure of independent reading behavior in the context of extended interactive reading was identified that is highly predictive of comprehension performance. This close relationship is easy to explain—if you tend to not read your turns completely, you do not get all the information needed to respond to comprehension questions. This can be characterized as a tendency to take advantage of reading opportunities, or to "show up": In order to make success at reading comprehension even possible, you need to actually read. Success in reading comprehension (as far as it is evidenced by percent correct in surface comprehension questions) is apparently directly related to consistently acting on opportunities to read.

One potential caveat to this interpretation of the measure is that it is not known whether within-bounds turns actually correspond to a reasonable attempt at reading. In principle, it is possible that the child was staring at the ceiling but knew when to stop staring just so the duration of his staring would coincide with reasonable boundaries of reading duration. To check whether students with higher showing-up tendency did in fact tend to read more, all the recordings of the children's reading turns were ran through automated speech recognition (ASR). The ASR hypothesis was then used to compute the proportion of words in the passage that the system recognized as correctly read by the child. Finally, average per child was computed and this value was correlated with the child's tendency to "show up". A correlation of r=0.77 was observed, suggesting that children who tended to "show up" also tended to read, not just stare at the screen for the right amount of time.

Another potential objection to thinking about PRT as a tendency to actually read the text is that perhaps children who had a low PRT were still reading—silently, instead of orally, as instructed. While this possibility cannot be completely ruled out, the following two observations suggest that this is not likely to be a substantial occurrence in our data. First, one study put the average rate of silent reading in 5th grade at 173 WPM and at 158 WPM for 4th graders; another study replicated the latter, with 154 WPM. Thus, to read consistently at more than 219 WPM would take a very fast reader, for this age; it is unlikely that many children in our sample could sustain such a rate. Secondly, diagram 600 of FIG. 6 suggests that readers with a high proportion of unreasonably fast (putative) readings did poorly on comprehension questions. It is unclear whether moving through the text very fast without taking in sufficient information to respond to questions should count as "silent reading". Indeed, in one study, very fast readers who could not respond to comprehension questions were removed from the norming study of silent reading rate. The data used herein did not seem to have a substantial presence of extremely fast, silent, comprehension-effective readings.

Children with low "showing up" seem to have consistently refused to read. It is possible that they perceived the reading as either requiring too much effort or even perhaps insurmountable. In consultation with the instructors in one of the camps, the average duration of student turns was reduced from 150 to 50 words (while keeping the narrator turn at 200 words) for two children with extremely low "showing up", as of half way into the program. The intervention was ineffective for one of them: [% "showing up", % correct] were [16%, 45%] before the change and [20%, 45%] after, but looked more promising for the other child: [23%, 44%] before vs [57%, 67%] after. Continuously monitoring the "showing-up" analytic may create opportunities for individualized assistance such as reduction in task difficulty; more experiments are needed for best time-point and extent of such interventions.

It is difficult to overstate the importance of literacy for adequate functioning in society, from educational attainment and employment opportunities to health outcomes. The current reading app was created with the goal of helping readers improve their reading skill, and used it to collect unique data on reading behavior when reading a long book for an extended period of time in a relaxed, low-stakes context. The collected data reflect behaviors that would traditionally be filtered out as "noise". Yet it is shown that aggregating such information across an extended period of time yields a consistent behavioral pattern which is strongly predictive of performance.

In the context of using analytics to obtain new knowledge about the process of reading in general and about the interplay between speed of reading and comprehension specifically, our findings suggest that actually getting down to the reading consistently across many such opportunities is an important mediating factor. Thus, once the reader is in fact acting on an opportunity to read in a consistent fashion, the expected relationships between reading sub-skills are observed. Inconsistent reading behavior in which many reading opportunities are not fully utilized leads to a breakdown in the observed subskill relationship and in the reading comprehension itself. The visionary author of children's books was thus quite prescient by placing could you right next to would you, and not only for eating green eggs.

Figure 7:
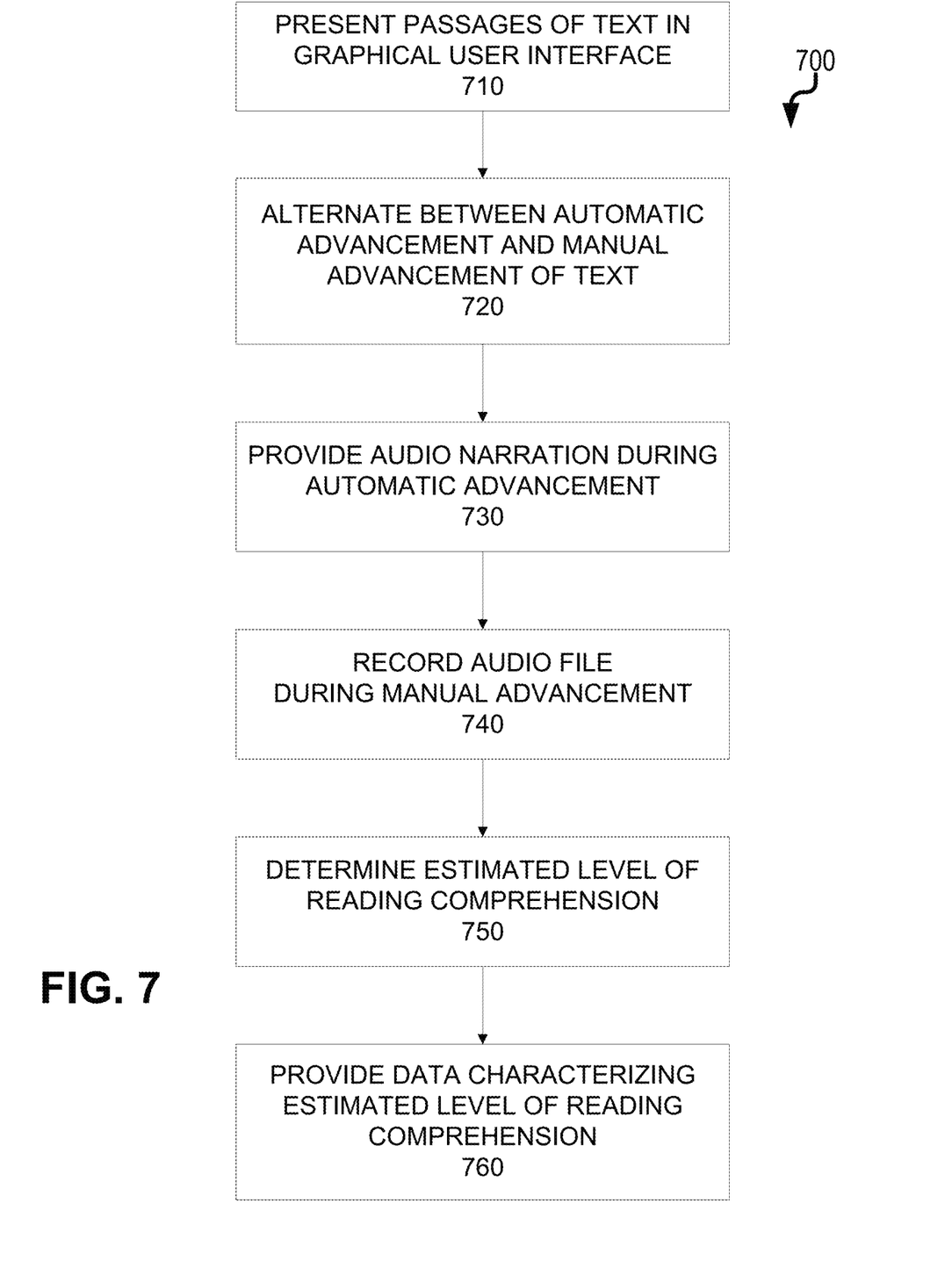
FIG. 7 is a process flow diagram illustrating assessing a level of reading comprehension of a user.

FIG. 7 is a process flow diagram 700 in which, at 710, sequential reading text comprising a plurality of passages is presented in a graphical user interface. Further, at 720, it is alternated between (i) automatically advancing through passages of the reading text and (ii) manually advancing (i.e., advancing based on user-generated input received via the graphical user interface) through passages of the reading text within the graphical user interface. Subsequently, at 730, an audio narration of the corresponding passages is provided during the automatic advancing of the reading text. At 740, during the manual advancing of the reading text an audio file is recorded. Further, at 750, a level of reading comprehension of the user is automatically determined for the user based, at least in part, on the recording. Other metrics can additionally be used in such determination. Next, at 760, data is provided that characterizes the determined level of reading comprehension of the user.

Figure 8:
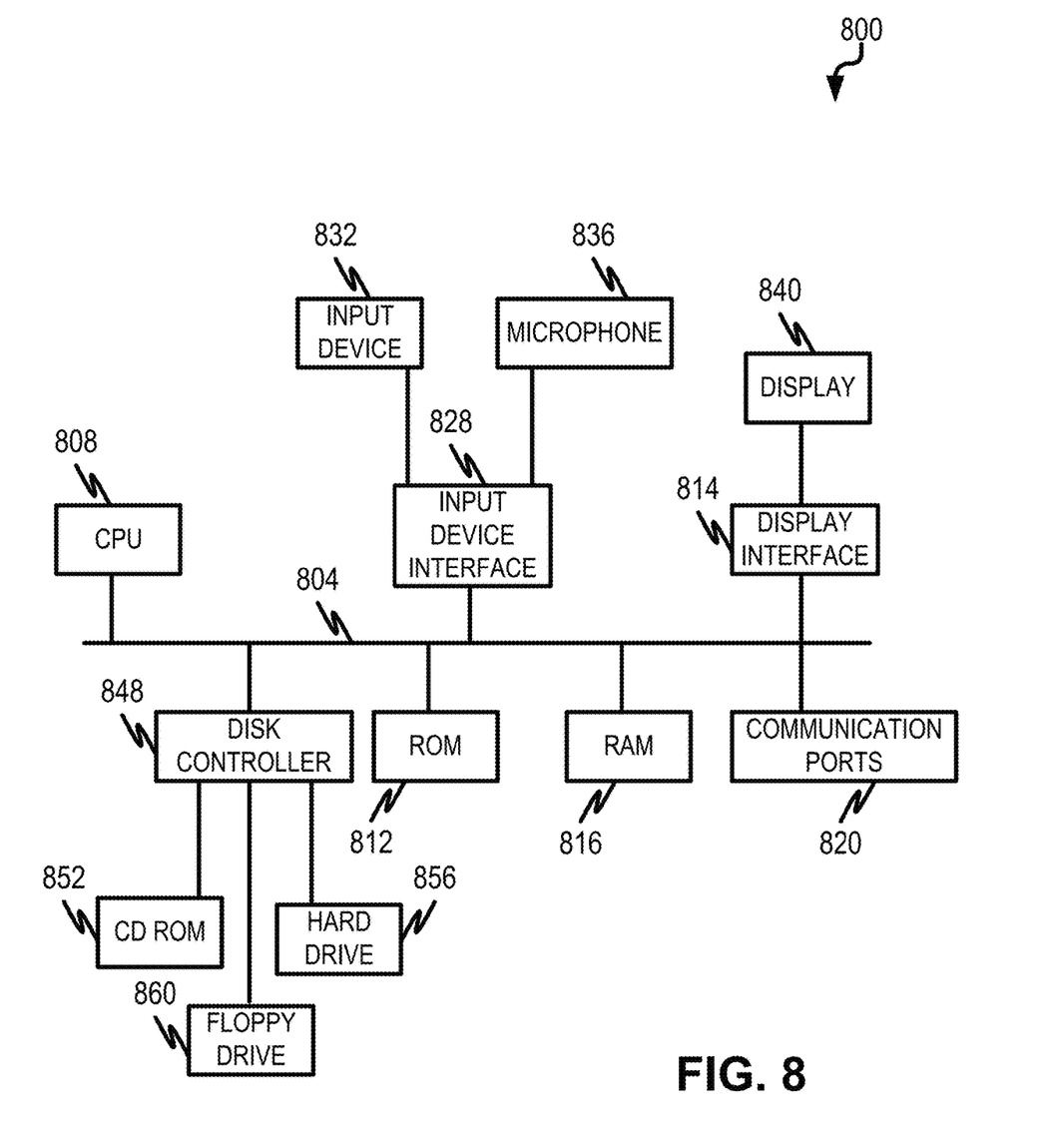
FIG. 8 is a diagram illustrating a computing device for implementing aspects described herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface with one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the at least one communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 via a display interface 814 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. The input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of assessing reading comprehension of a user, the method being implemented by one or more data processors and comprising:
presenting, in a graphical user interface, sequential reading text comprising a plurality of passages;

automatically alternating, while sequentially advancing through the plurality of passages and without user-input, between (i) a first state comprising automatically advancing through passages of the reading text and (ii) a second state comprising manually advancing through passages of the reading text within the graphical user interface, the manual advancing being in response to user-generated input received via the graphical user interface;

providing, during the first state, an audio narration of the corresponding passages;

recording, during the second state, an audio file;

periodically displaying, in the graphical user interface, comprehension questions in between the alternating between the first state and the second state;

receiving, by way of user-generated input received via the graphical user interface, answers to the comprehension questions;

automatically determining, based at least in part on the recording and the received answers, an estimated level of reading comprehension of the user, wherein the estimated level of reading comprehension is generated by a machine learning model, the output of which, indicating an ability of the user to understand meaning in the reading text, the machine learning model being trained using data derived from a population of readers when reading the sequential reading text including observed behavior in terms of response time and correctness of responses to comprehension questions; and providing data characterizing the determined estimated level of reading comprehension of the user.

2. The method of claim 1, wherein an average amount of time spent by the user reading a page is used to estimate the level of reading comprehension.

3. The method of claim 2 further comprising:
parsing the recording into text using at least one automatic speech recognition algorithm; and
automatically comparing the parsed text with the corresponding passages;
wherein the estimated level of reading comprehension is further based on the automatic comparison.

4. The method of claim 1 further comprising:
logging a number of user-initiated page turns during the manual advancing.

5. The method of claim 4 further comprising:
determines an average amount of time per user-initiated page turn.

6. The method of claim 1, wherein the providing data comprises at least one
of: causing the determined estimated reading comprehension of the user to be displayed in an electronic visual display, transmitting the determined estimated level of reading comprehension of the user to a remote computing system, loading the determined estimated level of reading comprehension of the user into memory, or storing the determined estimated level of reading comprehension of the user on a physical hard drive.

7. The method of claim 1, wherein the graphical user interface forms part of a dedicated reading application to be executed on a tablet computer or a mobile phone.

8. The method of claim 1, wherein the at least one machine learning model is trained using historical data generated by a plurality of users.

9. The method of claim 8, wherein the at least one machine learning model is a neural network model or a logistic regression model.

10. A system of assessing reading comprehension of a user comprising:
at least one data processor; and
memory storing instructions which, when executed by the at least one data processor, result in operations comprising:
presenting, in a graphical user interface, sequential reading text comprising a plurality of passages;
automatically alternating, while sequentially advancing through the plurality of passages and without user-input, between (i) a first state comprising automatically advancing through passages of the reading text and (ii) a second state comprising manually advancing through passages of the reading text within the graphical user interface, the manual advancing being in response to user-generated input received via the graphical user interface;
providing, during the first state, an audio narration of the corresponding passages;
recording, during the second state, an audio file;
periodically displaying, in the graphical user interface, comprehension questions in between the alternating between the first state and the second state;
receiving, by way of user-generated input received via the graphical user interface, answers to the comprehension questions;
automatically determining, based at least in part on the recording and the received answers, an estimated level of reading comprehension of the user, wherein the estimated level of reading comprehension is generated by at least one machine learning model, the output of which, indicating an ability of the user to understand meaning in the reading text, the machine learning model being trained using data derived from a population of readers when reading the sequential reading text including observed behavior in terms of response time and correctness of responses to comprehension questions; and
providing data characterizing the determined estimated level of reading comprehension of the user.

11. The system of claim 10, wherein an average amount of time spent by the user reading a page is used to estimate the level of reading comprehension.

12. The system of claim 11, wherein the operations further comprise: parsing the recording into text using at least one automatic speech recognition algorithm; and
automatically comparing the parsed text with the corresponding passages;
wherein the estimated level of reading comprehension is further based on the automatic comparison.

13. The system of claim 10, wherein the operations further comprise: logging a number of user-initiated page turns during the manual advancing.

14. The system of claim 13, wherein the operations further comprise: determines an average amount of time per user-initiated page turn.

15. The system of claim 10, wherein the providing data comprises at least one of:
causing the determined estimated reading comprehension of the user to be displayed in an electronic visual display, transmitting the determined estimated level of reading comprehension of the user to a remote computing system, loading the determined estimated level of reading comprehension of the user into memory, or storing the determined estimated level of reading comprehension of the user on a physical hard drive.

16. The system of claim 10, wherein the graphical user interface forms part of a dedicated reading application to be executed on a tablet computer or a mobile phone.

17. The method of claim 10, wherein the at least one machine learning model trained using historical data generated by a plurality of users, wherein the at least one machine learning model is a neural network model or a logistic regression model.

18. A non-transitory computer program product storing instructions which, when executed by at least one computing device, result in operations comprising:

presenting, in a graphical user interface, sequential reading text comprising a plurality of passages;

automatically alternating, while sequentially advancing through the plurality of passages and without user-input, between (i) a first state comprising automatically advancing through passages of the reading text and (ii) a second state comprising manually advancing through passages of the reading text within the graphical user interface, the manual advancing being in response to user-generated input received via the graphical user interface;

providing, during the first state, an audio narration of the corresponding passages;

recording, during the second state, an audio file;

logging, during the second state, words looked up in an electronic dictionary, a rate of page turn, and a rate of inactivity/pausing;

periodically displaying, in the graphical user interface, comprehension questions in between the alternating between the first state and the second state;

receiving, by way of user-generated input received via the graphical user interface, answers to the comprehension questions;

automatically determining, based at least in part on the recording and the received answers, an estimated level of reading comprehension of the user, wherein the estimated level of reading comprehension is generated by at least one machine learning model, the output of which, indicating an ability of the user to understand meaning in the reading text, the machine learning model being trained using data derived from a population of readers when reading the sequential reading text including observed behavior in terms of response time and correctness of responses to comprehension questions; and providing data characterizing the determined estimated level of reading comprehension of the user.

\* \* \* \* \*